US006860510B2

(12) United States Patent
Ogawa et al.

(10) Patent No.: US 6,860,510 B2
(45) Date of Patent: Mar. 1, 2005

(54) MULTISTAGE INFLATING-TYPE HYBRID INFLATOR

(75) Inventors: Akihisa Ogawa, Himeji (JP); Masayuki Yamazaki, Himeji (JP); Yasunori Iwai, Shijyonawate (JP); Eiichi Ryobo, Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 20 days.

(21) Appl. No.: 10/224,405

(22) Filed: Aug. 21, 2002

(65) Prior Publication Data

US 2003/0071447 A1 Apr. 17, 2003

Related U.S. Application Data

(60) Provisional application No. 60/359,900, filed on Feb. 28, 2002.

(30) Foreign Application Priority Data

Aug. 21, 2001 (JP) ....................................... 2001-249761

(51) Int. Cl.[7] ................................................ B60R 21/26
(52) U.S. Cl. ....................................... 280/736; 280/741
(58) Field of Search ................................ 280/736, 740, 280/741, 742, 737

(56) References Cited

U.S. PATENT DOCUMENTS

| | | | | | |
|---|---|---|---|---|---|
| 3,758,131 A | | 9/1973 | Stephenson et al. | | |
| 6,019,389 A | | 2/2000 | Burgi et al. | | |
| 6,032,979 A | * | 3/2000 | Mossi et al. | ................ | 280/741 |
| 6,168,200 B1 | * | 1/2001 | Greist et al. | ................ | 280/736 |
| 6,189,927 B1 | * | 2/2001 | Mossi et al. | ................ | 280/741 |
| 6,199,906 B1 | * | 3/2001 | Trevillyan et al. | .......... | 280/741 |
| 6,289,820 B1 | * | 9/2001 | Anacker et al. | ............ | 102/530 |
| 6,315,322 B1 | * | 11/2001 | Mika | .......................... | 280/736 |
| 6,364,353 B2 | * | 4/2002 | Green et al. | ................ | 280/736 |
| 6,422,601 B1 | * | 7/2002 | Quioc | ........................ | 280/741 |
| 6,491,320 B1 | * | 12/2002 | Nakashima et al. | ........ | 280/736 |
| 6,491,321 B1 | * | 12/2002 | Nakashima et al. | ........ | 280/736 |
| 6,543,805 B2 | * | 4/2003 | McFarland et al. | ......... | 280/736 |
| 6,626,461 B2 | * | 9/2003 | Koga et al. | ................. | 280/736 |

FOREIGN PATENT DOCUMENTS

| | | | |
|---|---|---|---|
| EP | 1190919 | A1 | 3/2002 |
| JP | 8-282427 | A | 10/1996 |
| JP | 2000-118347 | A | 4/2000 |
| JP | 2001-163170 | A | 6/2001 |
| JP | 2001-191888 | A | 7/2001 |
| WO | WO 00/32448 | A1 | 6/2000 |

* cited by examiner

*Primary Examiner*—Paul N. Dickson
*Assistant Examiner*—Toan C To
(74) *Attorney, Agent, or Firm*—Birch, Stewart, Kolasch & Birch, LLP

(57) ABSTRACT

A multistage inflating-type hybrid inflator in which a malfunction does not occur is provided.

When a first gas generating chamber 130 is first burnt, a combustion gas flowed out of first communication holes 136 advances in a direction towards an inner wall of an inflator housing 102 but it does not flow in a direction towards a second gas generating chamber 140. For this reason, the malfunction of the second gas generating chamber 140 cannot occur due to heat energy of the combustion gas.

8 Claims, 5 Drawing Sheets

(a)

MULTISTAGE INFLATING-TYPE HYBRID INFLATOR

This application claims the benefit of Prov. application 60/359,900, filed on Feb. 28, 2002.

TECHNICAL FIELD TO WHICH THE INVENTION BELONGS

The present invention relates to a multistage inflating-type hybrid inflator suitable for an air bag apparatus mounted on a motor vehicle, and an air bag system.

PRIOR ART

With the development of an inflator for an inflating-type safety system of motor vehicles, a hybrid inflator using both a pressurized gas and a solid gas generating agent has been attracting attention. A main design requirement for a hybrid inflator is that the inflator inflates an air bag to a predetermined amount in a predetermined time so that the air bag is effectively activated. Various proposals concerning a structure to meet the requirement have heretofore been made (for example, as referred in JP-A 08-282427).

Among such hybrid inflators, a multistage inflating-type hybrid inflator having two gas generating chambers can take the following three combustion states according to the magnitude of an impact imparted on a vehicle.

The first combustion state is a combustion state where a combustion gas is caused to flow from only one of the gas generating chambers.

The second combustion state is a combustion state where a time lag is set between outflows of combustion gases from the two gas generating chambers.

The third combustion state is a combustion state where combustion gases are caused to simultaneously flow out from the two gas generating chambers.

In the first and second combustion states of these states, it is important in view of securing safety of a vehicle passenger that a malfunction is prevented from occurring due to that heat energy flowed out of one of the gas generating chambers is conducted to the other gas generating chamber to ignite a gas generating agent therein.

DISCLOSURE OF THE INVENTION

An object of the present invention is to provide a multistage inflating-type hybrid inflator capable of inflating an air bag rapidly and reliably without any malfunction, and an air bag system using the hybrid inflator.

The present invention provides, as one means for solving the above problem, a multistage inflating-type hybrid inflator comprising an inflator housing, two gas generating chambers provided with an gas generating agent which is accommodated in the inflator housing, an ignition chamber provided with an igniter which is connected to the two gas generating chambers, a diffuser portion connected to the inflator housing and provided with a gas discharging port, a pressurized medium charged inside the inflator housing, and a principal rupturable plate closing between the inflator housing and the diffuser portion, wherein the first gas generating chamber and the second gas generating chamber are arranged radially in parallel with each other to be spaced from each other, the respective chambers are provided with one or two or more first communication holes which communicate the first gas generating chamber with the inflator housing and one or two or more second communication holes which communicate the second gas generating chamber with the inflator housing, at least one of the opening direction of the first communication holes and the axial position of the first communication holes is adjusted so that heat energy generated in the first gas generating chamber is prevented from flowing into the second gas generating chamber to ignite the gas generating agent therein.

As described above, there are the first to third states as the combustion states of the gas generating agents in the hybrid inflator. However, in the first and second combustion states, there is a risk that, when heat energy flowed out of the first communication holes in the first gas generating chamber is conducted in the second gas generating chamber through the second communication holes, the second gas generating agent is ignited and burnt without activation of the igniter.

As described above, however, since heat energy in the first gas generating chamber can be prevented from being conducted in the second gas generating chamber by adjusting the opening direction of the first communication holes, or the axial position of the first communication holes or both thereof, the malfunction can be prevented. At this time, the opening direction of the second communication holes is not limited particularly. Further, since the first gas generating chamber and the second gas generating chamber are disposed to be spaced from each other, heat energy generated in the first gas generating chamber is prevented from conducting via a wall of the first gas generating chamber and a wall of the second gas generating chamber to ignite and burn the second gas generating agent, and thereby, a malfunction can be also avoided.

In the above invention, such a configuration can be employed that the opening direction of the first communication holes is the radial direction, and they do not face the second gas generating chamber but they face an inner wall of the inflator housing. At this time, the opening direction of the second communication holes is not limited particularly.

Since heat energy generated in the first gas generating chamber is prevented from conducting in the second gas generating chamber by adjusting the opening direction of the first communication holes to give a directionality to orientation of the combustion gas flow, the above malfunction can be prevented.

Also, in the above invention, the opening direction of the first communication holes can be set to an axial direction. At this time, the opening direction of the second communication holes is not limited particularly.

As described above, since heat energy generated in the first gas generating chamber is prevented from conducting in the second gas generating chamber by setting the opening direction of the first communication holes to the axial direction, the above malfunction can be prevented.

Further, in the above invention, such a configuration can be employed that the first communication holes and the second communication holes are opened radially, and they are made different in the axial longitudinal position.

As described above, since heat energy generated in the first gas generating chamber is prevented from conducting in the second gas generating chamber by making the first communication holes and the second communication holes different in the axial longitudinal position, the above malfunction can be prevented.

In the above invention, also, such a configuration can be employed that the opening direction of some or all of one or two or more second communication holes provided in the second gas generating chamber face an inner wall of the inflator housing. Since combustion gas is not generated in the second gas generating prior to generation of combustion gas in the first gas generating chamber, the second communication holes may be arranged to face the first gas generating chamber.

Also in the above invention, such a configuration can be employed that the first gas generating chamber and the second gas generating chamber are made different in the axial length.

Further, in the above invention, such a configuration can be employed that at least one of the first gas generating chamber and the second gas generating chamber is closed at an axial one end (the end opposite to the ignition chamber) by a retainer, and the retainer is fixed to a gas generating chamber by crimping one end portion of the gas generating chamber.

When the pressurized medium used in this invention has a composition comprising oxygen and an inert gas such as, argon or helium (nitrogen is also included in the inert gas in the present invention), the oxygen works to convert carbon monoxide and hydrogen generated due to the combustion of a gas generating agent as a gas generating means into carbon dioxide and water vapor, and the argon works to promote the thermal expansion of the pressurized medium. It is preferable to contain helium in the pressurized medium since the leakage of the pressurized medium can be detected easily, and consequently distribution of imperfect products can be prevented. A charging pressure of the pressurized medium (—pressure inside the inflator housing) is preferably 10,000 to 70,000 kPa, and more preferably, 20,000 to 50,000 kPa. The pressurized medium may, or may not include oxygen, and when oxygen is included, it is preferable that the maximum amount is 30 mol %.

As the first gas generating agent accommodated in the first gas generating chamber and the second gas generating agent accommodated in the second gas generating chamber which are used in this invention, a gun propellant can be used, for example. As the gun propellant, a single-base gun propellant, a double-base gun propellant and a triple-base gun propellant can be used. In addition to these propellants, it is possible to use a gun propellant obtained by mixing a secondary explosive, a binder, a plasticizer, a stabilizer and the like, and molding the resultant mixture in a desired shape.

The secondary explosive can include hexahydrotrinitrotriazine (RDX), cyclotetramethylene tetranitramine (HMX), pentaerithritol tetranitrate (PETN), triaminoguanidine nitrate (TAGN) and the like. For example, when a gas generating agent using RDX as the secondary explosive is burnt in an oxygen-absent atmosphere under a pressure of 20,670 kPa and at a combustion temperature of 3348 k, formed gas is of a combustion gas comprises 33 mol % of nitrogen, 25 mol % of carbon monoxide, 23 mol % of water vapor, 8 mol % of carbon dioxide and other gas components.

The binder can include cellulose acetate, cellulose acetate butylate, cellulose acetate propiolate, ethyl cellulose, polyvinyl acetate, azide polymer, polybutadiene, hydrogenated polybutadiene and polyurethane; the plasticizer may comprise trimethylolethane trinitrate, butantriol trinitrate, nitroglycerine, bis (2,2-dinitropropyl) acetal/formal, glycidyl azide and acetyltriethyl citrate and the like; and the stabilizer may comprise ethlcentralite, diphenylamine, resocinol, and the like.

In a preferable ratio of the secondary explosive to the binder, plasticizer and stabilizer, the secondary explosive is about 50 to 90 wt. % and the binder, plasticizer and stabilizer in all are about 10 to 50 wt. %.

It is difficult in some cases to burn the gas generating agent of the above-described composition under normal pressure. However, in the hybrid inflator according to the present invention, the interior thereof is maintained at a high pressure in advance, the gas generating agents can be burnt stably and smoothly.

In addition, as the first gas generating agent accommodated in the first gas generating chamber and the second gas generating agent accommodated in the second gas generating chamber, for example, it is possible to use a material including fuel and oxidizing agent, or fuel, oxidizing agent and a slag-forming agent being mixed with binder if required, and formed into a desired shape. If such a gas generating agent is used, a gas generated by combustion of the agent can be used for developing the air bag together with the pressurized medium. Especially when the gas generating agent including the slag-forming agent is used, an amount of mist discharged from the inflator can be largely reduced.

Preferably, the fuel can be one or at least two selected from the group consisting of guanidine derivatives such as nitroguanidine (NQ), guanidine nitrite (GN), guanidine carbonate, amino nitroguanidine, amino guanidine nitrite, amino guanidine carbonate, diamino guanidine nitrite, diamino guanidine carbonate, and triamino guanidine nitrite. As fuel, one or two or more materials selected from a group comprising tetrazole and tetrazole derivative can be used.

As the oxidizing agent, one or at least two materials selected from the group comprising strontium nitrate, potassium nitrate, ammonium nitrate, potassium perchlorate, copper oxide, ferrous oxide, a basic copper nitrate are preferably used. A preferable amount of the oxidizing agent is 10 to 80 parts by weight, and more preferably, 20 to 50 parts by weight with respect to 100 parts by weight of the fuel.

As the slag-forming agent, one or at least two materials selected from the group comprising acid clay, talc, bentonite, diatomaceous earth, kaolin, silica, alumina, sodium silicate, silicon nitride, silicon carbide, hydrotalsite, and a mixture thereof are preferably used. A preferable amount of the slag-forming agent is 0 to 50 parts by weight, and more preferably, 1 to 10 parts by weight with respect to 100 parts by weight of the fuel.

As the binder, one or at least two materials selected from the group comprising sodium salt of carboxymethylcellulose, hydroxyethyl cellulose, starch, polyvinyl alcohol, guar gum, microcrystal cellulose, polyacrylamide, calcium stearate, and the like are preferably used. A preferable amount of binder is 0 to 30 parts by weight, and more preferably, 3 to 10 parts by weight with respect to 100 parts by weight of the fuel.

The present invention further provides an air bag system comprising an activation signal-outputting means including an impact sensor and a control unit, and a module case in which the above-described multistage-inflating hybrid inflator and an air bag are accommodated.

In the present invention, the term "a gas generator" means a unit having a gas generating function of generating a high temperature combustion gas due to combustion of the gas generating means (gas generating agent) stored in the gas generator housing (gas generating chamber), thereby allowing the high temperature combustion gas to flow into the inflator housing. And the hybrid inflator includes the gas generator inside a inflator housing thereof.

The term "heat energy" used in the present invention is energy generated due to a combustion gas obtained by combustion of a gas generating agent, and includes one, two, three, or all four of the following (i) to (iv): (i) a combustion gas and/or heat generated by combustion of a gas generating agent, (ii) a pressurized medium whose temperature increases due to a combustion gas and/or heat. (iii) one constituent part whose temperature increases due to contact with these gas and/or heat, and (iv) heat conduction from the one constituent part to another constituent part.

The term "mist" used in this invention is a solid component (for example, a metal component) contained in a gas generating agent, which is generated by combustion of a gas generating agent.

In the hybrid inflator of the present invention, the opening direction of the first communication holes or the like is adjusted so that combustion gas generated from the first gas generating chamber does not flow in the second gas generating chamber. For this reason, such a malfunction that the second gas generating agent in the second gas generating chamber is burnt by combustion gas generated from the first gas generating chamber cannot occur.

PREFERRED EMBODIMENT OF THE PRESENT INVENTION

Figure 1:
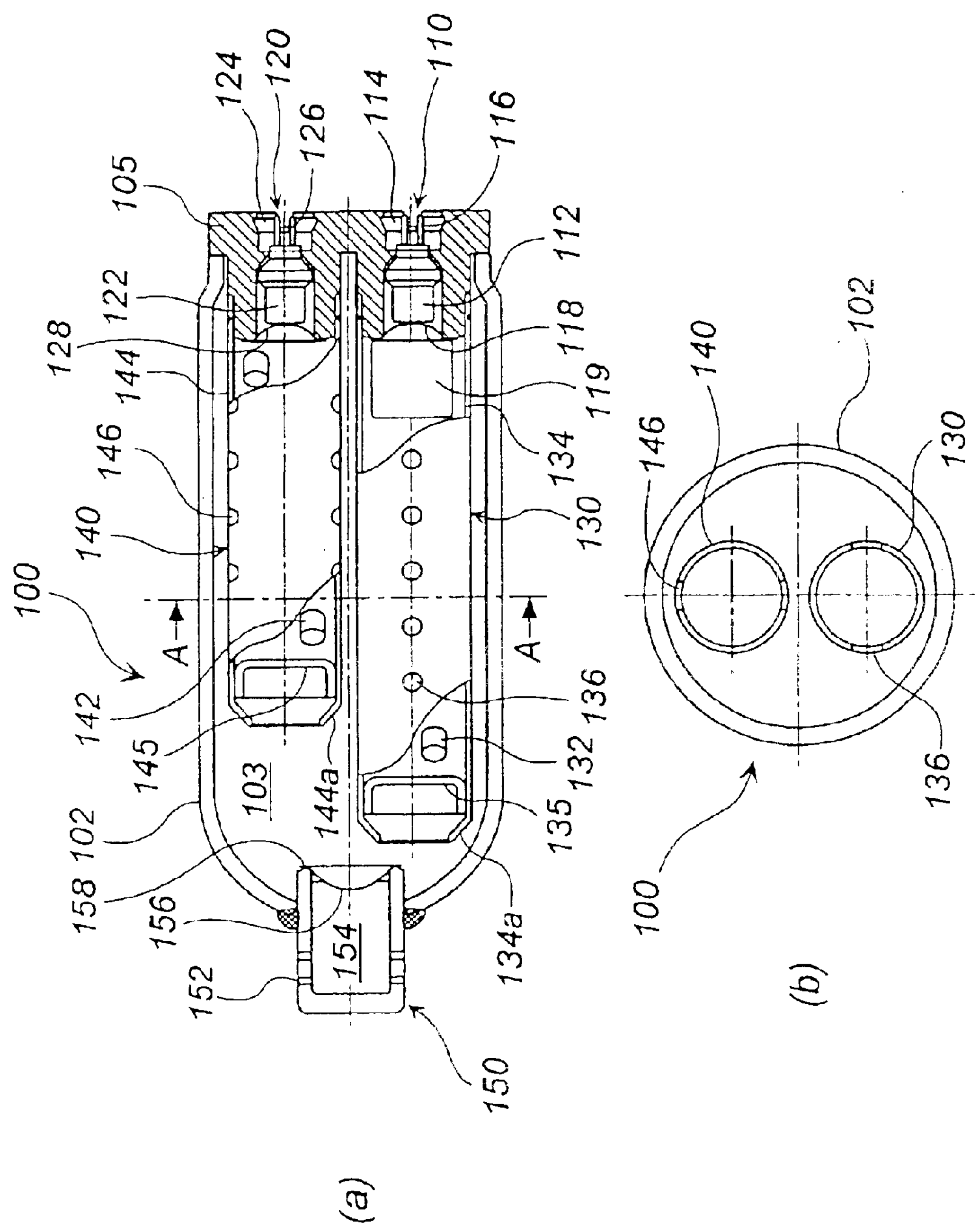
In FIG. 1, FIG. 1(*a*) is an axial sectional view of a hybrid inflator, and FIG. 1(*b*) is a sectional view cut along A—A in the direction shown by the arrows in FIG. 1(*a*)
Figure 2:
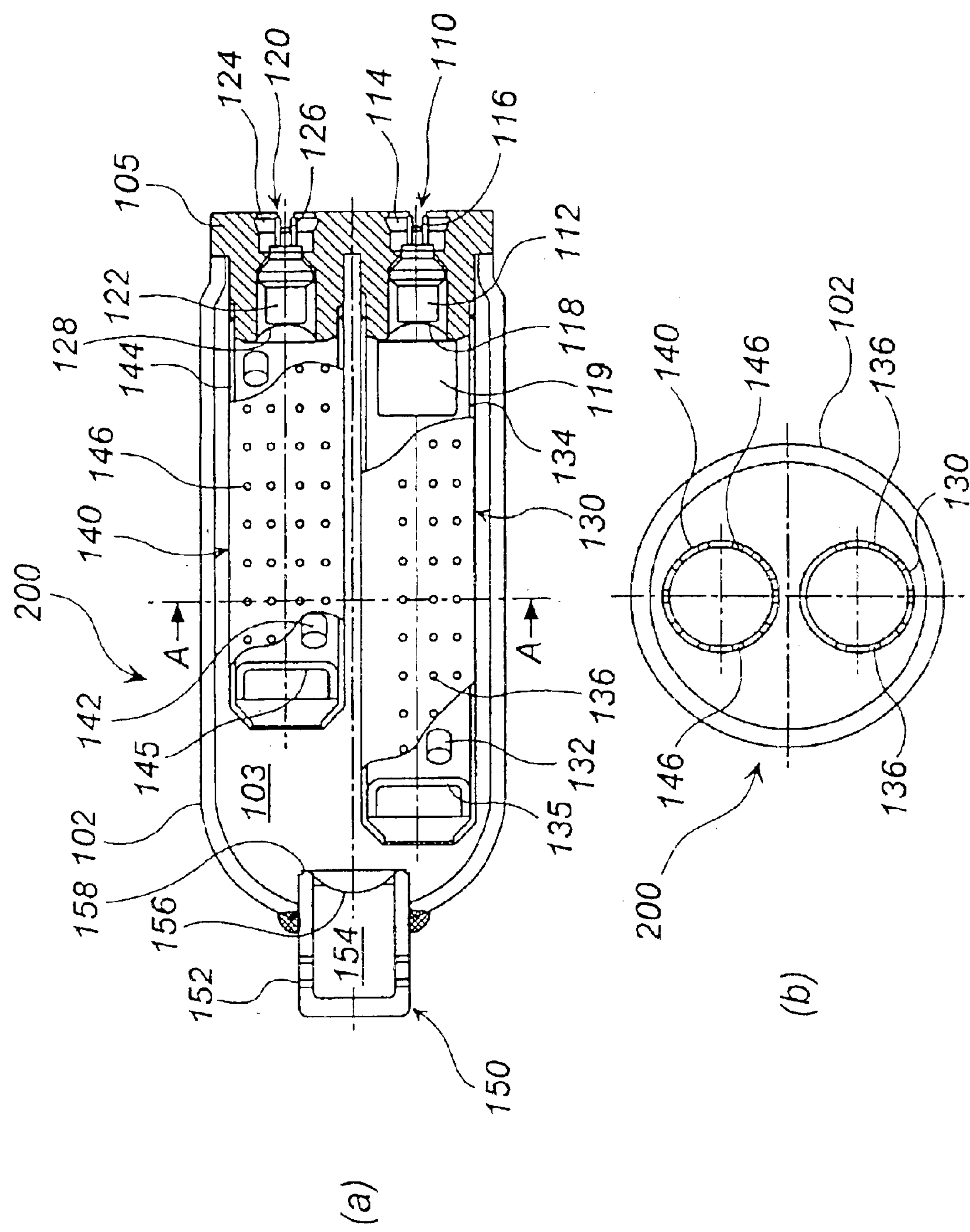
In FIG. 2, FIG. 2(*a*) is an axial sectional view of a hybrid inflator, and FIG. 2(*b*) is a sectional view cut along A—A in the direction shown by the arrows in FIG. 2(*a*)
Figure 3:
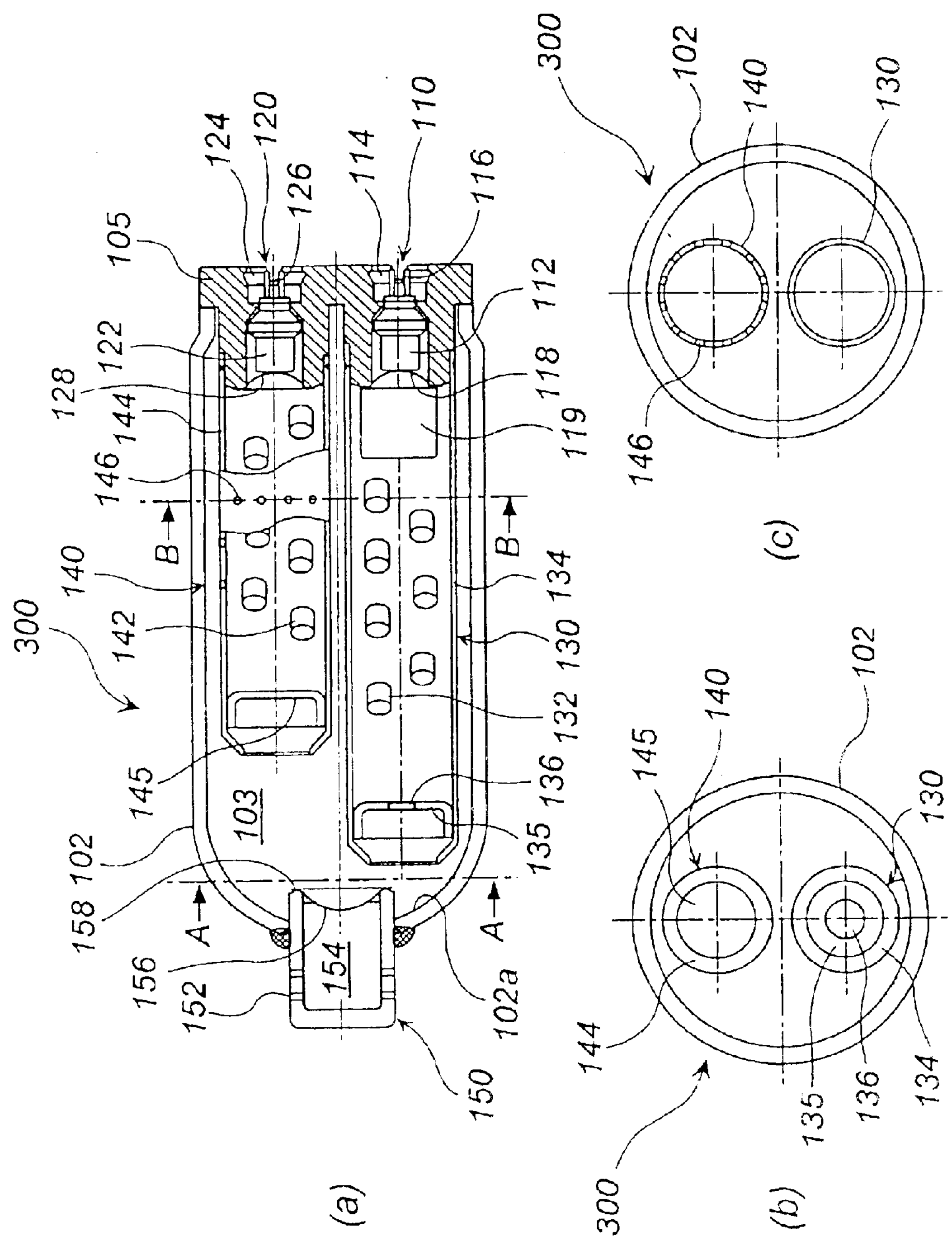
In FIG. 3, FIG. 3(*a*) is an axial sectional view of a hybrid inflator, FIG. 3(*b*) is a sectional view cut along A—A in the direction shown by the arrows in FIG. 3(*a*), and FIG. 3(*c*) is sectional view cut along B—B in the direction shown by the arrows in FIG. 3(a)
Figure 4:
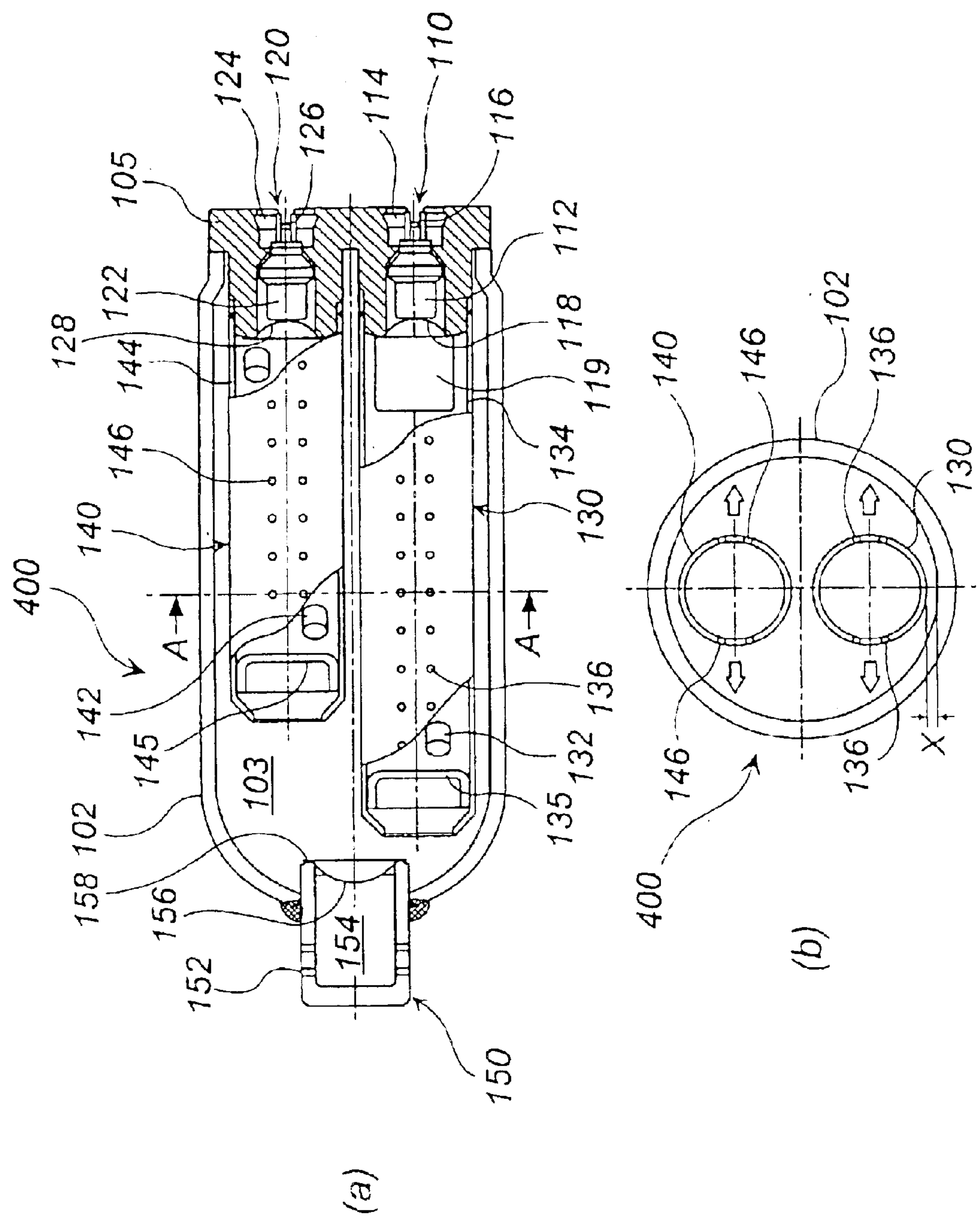
In FIG. 4, FIG. 4(*a*) is an axial sectional view of a hybrid inflator, and FIG. 4(*b*) is a sectional view cut along A—A in the direction shown by the arrows in FIG. 4(*a*); and In FIG. 5, FIG. 5(*a*) is an axial sectional view of a hybrid inflator, FIG. 5(*b*) is a sectional view cut along A—A in the direction shown by the arrows in FIG. 5(*a*), and FIG. 5(*c*) is a sectional view cut along B—B in the direction shown by the arrows in FIG. 5(*a*).
Figure 5:
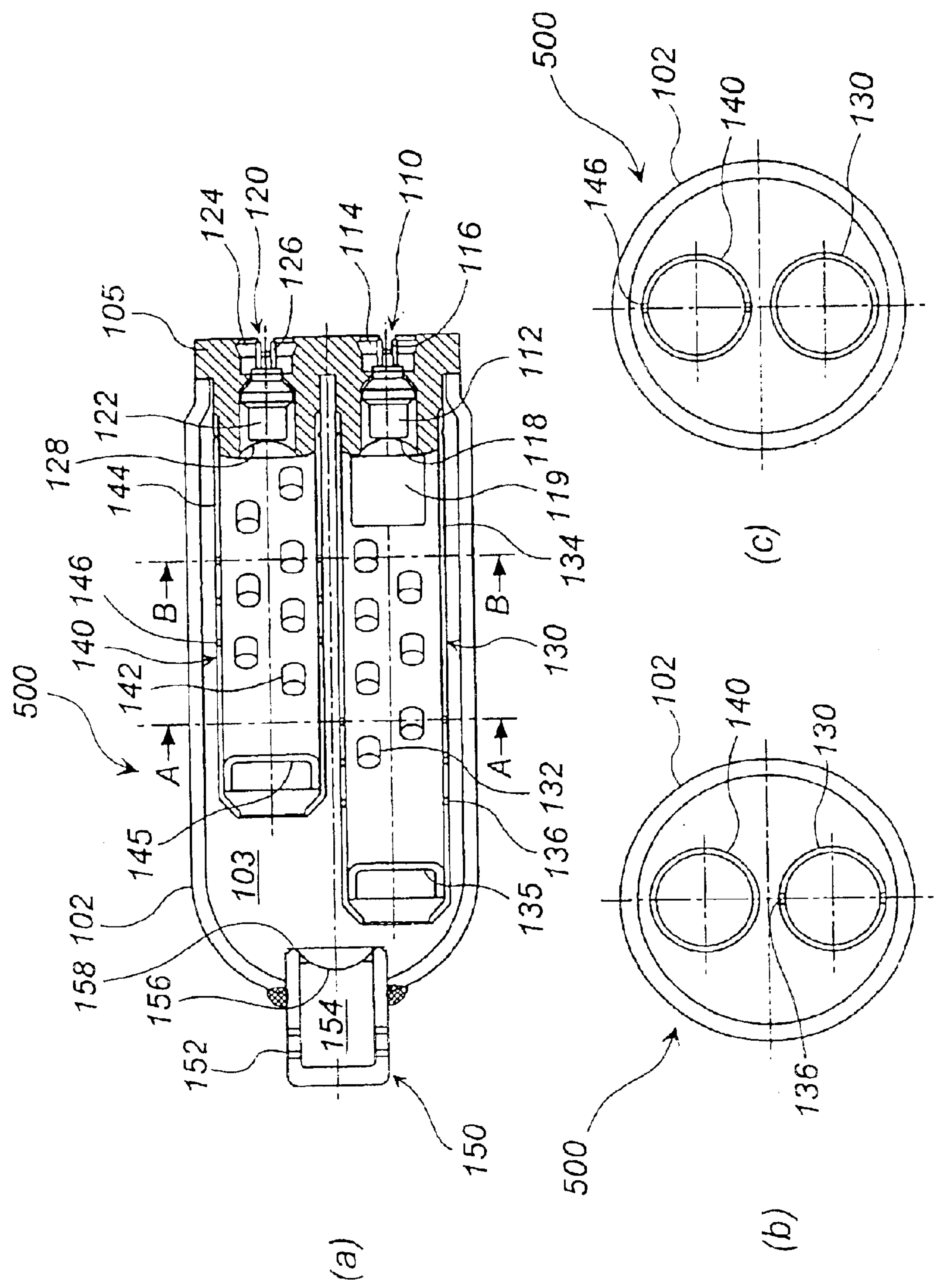

Embodiments of the present invention will be explained below with reference to FIG. 1 to FIG. 5. FIG. 1(*a*) is an axial sectional view (incidentally, a sectional view of a gas generating chamber partially cut off) of a multistage inflating-type hybrid inflator (hereinafter, referred to as "hybrid inflator"), and FIG. 1(*b*) is a sectional view cut along A—A in the direction shown by the arrows in FIG. 1(*a*). FIG. 2(*a*) is an axial sectional view (incidentally, a sectional view of a gas generating chamber partially cut off) of a hybrid inflator, and FIG. 2(*b*) is a sectional view cut along A—A in the direction shown by the arrows in FIG. 2(*a*). FIG. 3(*a*) is an axial sectional view (incidentally, a sectional view of a gas generating chamber partially cut off) of a hybrid inflator, FIG. 3(*b*) is a sectional view cut along A—A in the direction shown by the arrows in FIG. 3(*a*), and FIG. 3(*c*) is a sectional view cut along B—B in the direction shown by the arrows in FIG. 3(*a*). FIG. 4(*a*) is an axial sectional view (incidentally, a sectional view of a gas generating chamber partially cut off) of a hybrid inflator, and FIG. 4(*b*) is a sectional view cut along A—A in the direction shown by the arrows in FIG. 4(*a*). FIG. 5(*a*) is an axial sectional view of a hybrid inflator, FIG. 5(*b*) is a sectional view cut along A—A in the direction shown by the arrows in FIG. 5(*a*), and FIG. 5(*c*) is a sectional view cut along B—B in the direction shown by the arrows in FIG. 5(*a*).

An embodiment of a hybrid inflator 100 shown in FIGS. 1(*a*), 1(*b*) will be explained below. An inflator housing 102 comprises a cylindrical pressure-resisting container, and its inner space 103 is charged with a pressurized medium and maintained at a high pressure. The pressurized medium is usually charged from a thin hole formed in a boss 105 connected to the inflator housing 102 or one end portion of the inflator housing 102 or the like, and the thin hole is closed by a sealing pin after the pressurized medium is charged.

The boss 105 is provided with a first ignition chamber 110 and a second ignition chamber 120. A first igniter 112 is accommodated and fixed in the first ignition chamber 110 and a second igniter 122 is accommodated and fixed in the second ignition chamber 120. The numerals 114 and 124 denote a connector, and the numerals 116 and 126 denote a conductive pin.

A first gas generating chamber 130 is provided in the axial extension line of the first ignition chamber 110, and a required amount of a first gas generating agent 132 is accommodated herein. A first rupturable plate 118 closes between the first ignition chamber 110 and the first gas generation chamber 130, and a flame transferring means 119 is disposed in the first gas generating chamber 130, to contact the first rupturable plate 118. The flame transferring means 119 comprises a transfer charge charged in a cup of aluminum or the like.

A second gas generating chamber 140 is provided in the axial extension line of the second ignition chamber 120, and a required amount of a second gas generating agent 142 is accommodated therein. The second rupturable plate 128 closes between the second ignition chamber 120 and the second gas generating chamber 140.

An outer shell of the first gas generating chamber 130 is formed by a first gas generating chamber housing 134, and the end portion of the chamber 130 opposite to the first igniter 112 is closed by a first retainer 135. The first retainer 135 is fixed at a predetermined position by crimping an end peripheral edge 134*a* of the first gas generating chamber housing 134. The first retainer 135 not only serves as a partition wall but also has a function for adjusting a volume of the first gas generating chamber 130 according to the amount of the gas generating agent, thereby retaining the gas generating agent.

A required number of first communication holes 136 are provided on a periphery of the first gas generating chamber housing 134, not radially facing the second gas generating chamber 140 but facing an inner wall surface of the inflator housing 102.

Since the first gas generating chamber 130 and the inner space 103 of the inflator housing 102 are in communication with each other through the first communication holes 136, the pressurized medium also flows into the first gas generating chamber 130, so that the first gas generating chamber is maintained in the same pressure as that in the inner space 103.

This is preferable because, by making a combustion gas generated in the first gas generating chamber 130 strike against the inner wall surface of the inflator housing 102, a portion of the mist contained in the combustion gas is adhered to and held on the inner wall surface of the inflator housing 102 and the mist is hardly discharged outside.

An outer shell of the second gas generating chamber 140 is formed by the second gas generating chamber housing 144, and an end portion of the chamber 140 opposite to the second igniter 122 is closed by a second retainer 145. The second retainer 145 is fixed at a predetermined position by crimping an end peripheral edge 144*a* of the second gas generating chamber housing 144. The second retainer 145 has a function similar to the first retainer 135.

A required number of second communication holes 146 are provided on a periphery of the second gas generating chamber housing 144, being opened radially, and the opening of the second communication holes 146 are formed in the direction of the first gas generating chamber 130 and in a direction of the inner wall surface of the inflator housing 102. A pressurized medium also flows into the second gas generating chamber 140 like the first gas generating chamber 130, and the second gas generating chamber 140 is maintained in the same pressure as that in the inner space 103. The first communication holes 136 and the second communication holes 146 are formed to be different from each other by 90° in the radial direction.

In the hybrid inflator 100, since the first gas generating chamber 130 and the second gas generating chamber 140 are arranged to be spaced from each other in parallel with each other in the radial direction, heat inside the first gas generating chamber 130 is prevented from conducting to the inside of the second gas generating chamber 140 via the first gas generating chamber housing 134 and the second gas generating chamber housing 144. Further, since the arrangement of the first communication holes 136 and the second communication holes 146 is controlled, heat energy from the first gas generating chamber 130 can be blocked, not to conduct to the inside of the second gas generating chamber 140, so that a malfunction of the hybrid inflator 100 can be avoided.

The volumes of the first gas generating chamber 130 and the second gas generating chamber 140 may be equal to each other or different from each other, and their sizes in the radial direction and the axial direction can be properly adjusted.

A diffuser portion 150 having a required amount of gas discharging ports 152 for discharging the pressurized medium and a combustion gas is provided in the other end portion of the inflator housing 102. The diffuser portion 150 is welded and fixed to the inflator housing 102 by laser welding, resistance welding, electron beam welding or the like.

Since an inner space 154 of the diffuser portion 150 and the inner space 103 of the inflator housing 102 are separated from each other by a principal rupturable plate 156, the inner space 154 is always maintained in the normal pressure. The principal rupturable plate 156 is welded and fixed at its flange (a peripheral edge portion of the opening portion) 158 to the diffuser portion 150 by laser welding, resistance welding, electron beam welding or the like. In this case, a filter member for removing mist or the like can be arranged to contact on gas discharging ports 152 inside the diffuser portion 150. As the filter member, a wire mesh, a punched metal or the like can be used.

According to the above hybrid inflator 100 shown in FIG. 1, the following particular effects can be obtained.

(1) Since the opening of the second communication holes 146 is restricted to the specific direction, almost all mist contained in a combustion gas discharged from the second communication holes 146 strikes against and adheres to the inner wall surfaces of the first gas generating chamber housing 134 and the inflator housing 102 which face and are close to the second communication holes, so that the mist can be hardly discharged outside.

(2) Since parts can be made common by setting the axial lengths of the first gas generating chamber 130 and the second gas generating chamber 140 to be equal to each other, manufacturing costs can be kept low.

(3) Since the opening directions of the first communication holes 136 and the second communication holes 146 are different from each other, positions to which mists discharged from the respective holes adhere are different from each other. For this reason, the previously adhered mist (of the first combustion gas) is prevented from being flung up and discharged to the outside by the combustion gas discharged from the second communication holes 146 following the discharge of the combustion gas (the first combustion gas) from the first communication holes 136.

Next, an embodiment of a hybrid inflator 200 shown in FIGS. 2(*a*) and 2(*b*) will be explained. The hybrid inflator 200 is different from the hybrid inflator 100 shown in FIGS. 1 only in the arrangement of the first communication hole and the second communication hole, and the same elements are designated with the same numbers, therefore a description thereof is omitted.

A required number of first communication holes 136 are provided on a periphery of the first gas generating chamber housing 134, being opened in a radial direction, and the orientation of these first communication holes 136 are adjusted in a direction in which the entire combustion gas flow strikes against an inner wall surface of the inflator housing 102 and they do not directly flow in a direction of the second gas generating chamber 140.

This is preferable because, by making a combustion gas generated in the first gas generating chamber 130 strikes against the inner wall surface of the inflator housing 102, a portion of the mist contained in the combustion gas flow is adhered to and held on the inner wall surface of the inflator housing 102, the mist can hardly be discharged outside.

A required number of second communication holes 146 are provided on the periphery of the second gas generating chamber housing 144, being opened radially, and the opening of these second communication holes 146 are formed in a plurality of directions including the direction towards the first gas generating chamber 130.

According to the above hybrid inflator 200 shown in FIGS. 2, the following particular effects can be obtained.

(1) Since the second communication holes 146 are uniformly arranged on the entire peripheral surface of the second gas generating chamber housing 144, it is unnecessary to decide the position the second gas generating chamber housing 144 in the circumferential direction thereof at the time of mounting, which facilitates assembling.

Next, an embodiment of a hybrid inflator 300 shown in FIGS. 3(*a*), 3(*b*) and 3(*c*) will be explained. The hybrid inflator 300 is different from the hybrid inflator 100 shown in FIGS. 1 only in the arrangement of the first communication holes and the second communication holes, and the same elements are designated with the same numerals, therefore a description thereof is omitted.

The first communication holes 136 are provided in a first retainer 135 of the first gas generating chamber housing 134, being opened axially, and they are not provided in the periphery of the first gas generating chamber housing 134.

Thus, by making a combustion gas generated in the first gas generating chamber 130 collide on a portion of the inflator housing 102 positioned in the vicinity of an end portion inner wall surface 102*a*, heat energy is prevented from conducting to the second gas generating chamber 140, so that a malfunction of the second gas generating chamber 140 is prevented.

A required number of second communication holes 146 are provided in the periphery of a second gas generating chamber housing 144, being opened radially, and the opening of these second communication holes 146 are formed in a plurality of directions including the direction towards the first gas generating chamber 130.

According to the above hybrid inflator 300 shown in FIGS. 3, the following particular effects can be obtained.

(1) Since the first communication holes 136 are formed in the axial direction, and the second communication holes 146 are uniformly formed on the entire peripheral surface of the second gas generating chamber housing 144, it is unnecessary to decide the positions of the first gas generating chamber housing 134 and the second gas generating chamber housing 144 in their circumferential directions at the time of mounting, which further facilitates assembling.

(2) Since it is unnecessary to form communication holes on the peripheral wall of the first gas generating chamber housing 134, working time can be shortened and working cost can also be reduced.

Next, an embodiment of a hybrid inflator 400 shown in FIGS. 4(*a*) and 4(*b*) will be explained. The hybrid inflator 400 is different from the hybrid inflator 100 shown in FIGS. 1 only in the arrangement of the first communication holes and the second communication holes, and the same elements are designated with the same numerals, therefore a description thereof is omitted.

A required number of first communication holes 136 are provided on the periphery of the first gas generating chamber housing 134, being opened radially, and the opening of these first communication holes 136 are adjusted to be directed in which the entire combustion gas strikes against an inner wall surface of the inflator housing 102, so that it does not directly flow into the second gas generating chamber 140.

By making a combustion gas generated in the first gas generating chamber 130 collide on the inner wall surface of the inflator housing 102, heat energy generated in the first gas generating chamber 130 is blocked from conducting to the second gas generating chamber 140, so that a malfunction of the second gas generating chamber 140 can be prevented. Further, it is preferable because a portion of the mist contained in the combustion gas flows is adhered to and held on an inner wall surface of the inflator housing 102, and therefore, the mist can be hardly discharged outside.

A required number of second communication holes 146 are provided in the periphery of the second gas generating chamber housing 144, being opened radially, and the opening of the these second communication holes 146 are adjusted to be directed in the same directions as those of the first communication holes 136.

According to the above hybrid inflator 400 shown in FIGS. 4, the following particular effects can be obtained.

(1) All of the first communication holes 136 and the second communication holes 146 are opened in the directions in which a space between the inner wall surface of the inflator housing 102 and each of the first gas generating chamber housing 134 and the second gas generating chamber housing 144 is larger (in the direction shown by the arrows in FIG. 4(*b*)) and they are not opened in the direction in which the space is smaller (in the direction perpendicular to the direction shown by the arrows in FIG. 4(*b*)). Therefore, as long as a space is secured in such an extent that each gas generating chamber housing can be inserted in the inflator housing 102, it is unnecessary to secure a sufficient space X in view of discharging of combustion gas, so that the size of the inflator housing 102 can be reduced in the radial direction thereof correspondingly.

(2) Since parts can be made common in the first gas generating chamber 130 and the second gas generating chamber 140 by setting the axial lengths of both the chambers equally, manufacturing cost can be kept low.

Next, an embodiment of a hybrid inflator 500 shown in FIGS. 5(*a*), 5(*b*) and 5(*c*) will be explained. The hybrid inflator 500 is different from the hybrid inflator 100 shown in FIG. 1 only in the arrangement of the first communication holes and the second communication holes, and the same parts are designated with the same numerals, therefore a description thereof is omitted.

In the hybrid inflator 500, the first gas generating chamber 130 is adjusted to have an axial length longer than that of the second gas generating chamber 140. In this case, the diameters of both the chambers can be set such that one thereof is longer or shorter than the other.

A required number of first communication holes 136 are provided in the periphery of the first gas generating chamber housing 134 to be opened in two radial directions (in the direction towards an inner wall surface of the inflator housing 102 and in the direction towards the second gas generating chamber 140), and also, they are provided close to the first retainer 135 inside the first gas generating chamber 130.

Meanwhile, a required number of second communication holes 146 are provided in the periphery of the second gas generating chamber housing 144 to be opened in the radial directions (in the direction towards the inner wall surface of the inflator housing 102 and in the direction towards the first gas generating chamber 130), and also, they are provided near to the axial central portion of the second gas generating chamber 140.

The opening directions of the first communication holes 136 and the second communication holes 146 are not limited to those shown in FIGS. 5, but they can be uniformly provided on the entire periphery, as the second communication holes 146 shown in FIG. 2(*b*) and FIG. 3(*b*), or they may not be uniformly arranged.

Even when one of the opening directions of one first communication holes 136 is towards the second gas generating chamber 140, by adjusting the axial longitudinal position, the first communication holes 136 do not face the second communication holes 146 correctly and an axial distance between the first communication hole 136 and the second communication hole 146 being closest to each other can be secured to such an extent that a malfunction does not occur. For this reason, since heat energy generated from the first gas generating chamber 130 is blocked from conducting to the second gas generating chamber 140, a malfunction can be prevented.

According to the above hybrid inflator 500 shown in FIG. 5, the following particular effects can be obtained.

(1) Since the first communication holes 136 are opposite to and are close to the second gas generating chamber housing 144 and the inner wall surface of the inflator housing 102, and the second communication holes 146 are opposite and are close to the first gas generating chamber housing 134 and the inner wall surface of the inflator housing 102, mist contained in the combustion gas discharged from these holes strikes against and adheres to walls opposite to and close to the holes, so that the mist can hardly be discharged outside.

(2) when the respective communication holes are uniformly provided on the entire peripheral surfaces, it becomes unnecessary to decide the position at the time of mounting, which facilitates assembling.

Next, the operation of the hybrid inflator 100 will be explained with reference to FIG. 1. When a vehicle collides, the first igniter 112 is activated and ignited by an activation signal-outputting means, so that the first rupturable plate 118 is ruptured and the flame-transferring means (transfer charge) 119 is ignited and burnt. Flame generated by the ignition and combustion of the transfer charge 119 flows into the first gas generating chamber 130 to ignite and burn the first gas generating agent 132, thereby generating a predetermined amount (an amount corresponding to the charged amount of the first gas generating agent 132) of a high-temperature combustion gas.

Since the combustion gas flowed out from the first communication holes 136 strikes against the inner wall surface of the inflator housing 102, heat energy is blocked from conducting to the second gas generating chamber 140. Since the pressure in the inner space 103 is increased simultaneously with the outflow of the combustion gas, and the principal rupturable plate 158 is ruptured, the pressurized medium and the combustion gas are ejected from the gas discharging ports 152 of the diffuser portion 150 to inflate an air bag mounted on an air bag module.

Further, the second igniter 122 is activated and ignited by the activation signal-outputting means simultaneously with or with a slight delay from the activation of the first igniter 112 to rupture the second rupturable plate 128 and then, the second gas generating agent 142 in the second gas generating chamber 140 is ignited and burnt, thereby generating a predetermined amount (an amount corresponding to the charged amount of the second gas generating agent 142) of a high-temperature combustion gas.

The difference in activating timings ("staggered activation timings" hereinafter) between the first igniter 112 and the second igniter 122 is set in relation to a degree of the impact received by a vehicle provided with an air bag system in order that a passenger can be protected more appropriately. When a vehicle undergoes a small impact, only the first igniter 112 is activated (in other words, only the first gas generating agent 132 is ignited and burnt), and when a vehicle undergoes a medium impact, the first igniter 112 is activated (in other words, the first gas generating agent 132 is ignited and burnt) and then slightly thereafter, the second igniter 122 is activated (in other words, the second gas generating agent 142 is ignited and burnt). When a vehicle undergoes a great impact, the first igniter 112 and the second igniter 122 are simultaneously activated (in other words, the first gas generating agent 132 and the second gas generating agent 142 are simultaneously ignited and burnt). Practically, the staggered activating timings are set to about 0 to 50 msec in order to meet from a small impact to a great impact.

When the second igniter 122 is activated, a high-temperature combustion gas generated from combustion of the second gas generating agent 142 flows into the inflator housing 102 from the communication holes 146 to increase a pressure therein, so that the combustion gas is ejected from the gas discharging ports 152 together with the remaining pressurized medium to further inflate the air bag.

By generating the combustion gas at two stages in accordance with a degree of impact received by the vehicle in this manner, a delayed start of an air bag's inflating action at the time of a vehicle collision can be prevented by the combustion of the first gas generating agent 132, and the pressurized medium can be discharged completely from the inflator housing 102 by the combustion of the second gas generating agent 142 to inflate the air bag immediately up to a satisfying safety level. Then, in this embodiment, the second gas generating agent 142 of the second gas generating chamber 140 is prevented from being ignited and burnt by heat energy from the first gas generating chamber 130 and a malfunction does not occur.

Incidentally, when a vehicle undergoes a small impact and only the first igniter 112 is activated, in a view of securing safety at the time of withdrawing the air bag later, it is desirable that the second igniter 122 is activated at about 100 msec after the activation of the first igniter 112 in order to burn the unburnt second gas generating agent 142. In the hybrid inflator of the present embodiment, except when the second igniter 122 is activated, the second gas generating agent 142 is never ignited within a period between about 0 and 120 msec after the first gas generating agent 132 is ignited and burnt by activation of the first igniter 112.

In addition, since two gas generating chambers are provided, this hybrid inflator can also be adapted to a mode of embodiment such that a combustion gas can be generated exclusively in the first gas generating chamber 130, a mode of embodiment such that combustion gases are simultaneously generated in the first and second gas generating chambers 130, 140, and a mode of embodiment such that an interval between the timings of generating respective combustion gases in the first gas generating chamber 130 and the second gas generating chamber 140 can be adjusted optionally.

What is claimed is:

1. A multistage inflating hybrid inflator comprising an inflator housing having an axial direction and a radial direction, a first gas generating chamber and a second gas generating chamber each provided with a gas generating agent which is accommodated in the inflator housing, a first ignition chamber and a second ignition chamber provided with first and second igniters, respectively, each of which is independently connected to the two one of said first and second gas generating chambers, a diffuser portion connected to the inflator housing and provided with a gas discharging port, a pressurized medium charged inside the inflator housing, and a principal rupturable plate closing between the inflator housing and the diffuser portion, wherein the first gas generating chamber and the second gas generating chamber are arranged radially within said inflator housing in parallel with each other and spaced apart from each other, the first gas generating chamber and the second gas generating chamber are provided with one or two or more first communication holes which communicate the first gas generating chamber with the inflator housing and one or two or more second communication holes which communicate the second gas generating chamber with the inflator housing, respectively, and the first communication holes and the second communication holes are provided such that the first communication holes do not directly oppose the second communication holes so that heat energy generated in the first gas generating chamber is prevented from flowing into the second gas generating chamber to ignite the gas generating agent therein.

2. A multistage inflating hybrid inflator as claimed in claim 1, wherein an opening direction of the first communication holes is the radial direction, and is not opposite to the second gas generating chamber but opposite to an inner wall of the inflator housing.

3. A multistage inflating hybrid inflator as claimed in claim 1, wherein an opening direction of the first communication holes is the axial direction.

4. A multistage inflating hybrid inflator as claimed in claim 1 or 2, wherein the first communication holes and one or two or more second communication holes are opened radially, and the axial longitudinal positions of the first communication holes and that of the second communication holes are different from each other.

5. A multistage inflating hybrid inflator as claimed in any one of claims 1 to 3, wherein the opening direction of part or all of the second communication holes face an inner wall of the inflator housing.

6. A multistage inflating hybrid inflator as claimed in any one of claims 1 to 3, wherein the first gas generating chamber and the second gas generating chamber are formed such that axial lengths thereof are different from each other.

7. A multistage inflating hybrid inflator as claimed in any one of claims 1 to 3, wherein at least one of the first gas generating chamber and the second gas generating chamber is closed at its axial one end portion by a retainer, and the retainer is fixed by crimping the axial end portion of at least one of the first gas generating chamber and the second gas generating chamber.

8. An air bag system provided with an activation signal-outputting means comprising an impact sensor and a control unit, and a module case in which a multistage inflating hybrid inflator as claimed in any one of claims 1 to 3 and an air bag are accommodated.

* * * * *